United States Patent
Passilly et al.

(10) Patent No.: US 11,002,977 B2
(45) Date of Patent: May 11, 2021

(54) DEVICE FOR SHAPING A LASER BEAM FOR AN ATOMIC SENSOR HAVING RETROREFLECTOR PRISM, LINEAR POLARIZER, AND FORM BIREFRINGENCE PLATE

(71) Applicants: Centre National de la Recherche Scientifique—CNRS, Paris (FR); Universite de Franche Comte, Besancon (FR)

(72) Inventors: Nicolas Passilly, Auxon-dessus (FR); Christophe Gorecki, Pin (FR); Vincent Maurice, Langres (FR)

(73) Assignee: CENTRE NATIONAL DE LA RECHERCHE SCIENTIFIQUE—CNRS, Besancon (FR)

( * ) Notice: Subject to any disclaimer, the term of this patent is extended or adjusted under 35 U.S.C. 154(b) by 581 days.

(21) Appl. No.: 15/748,563

(22) PCT Filed: Jul. 21, 2016

(86) PCT No.: PCT/FR2016/051890
§ 371 (c)(1),
(2) Date: Jan. 29, 2018

(87) PCT Pub. No.: WO2017/017351
PCT Pub. Date: Feb. 2, 2017

(65) Prior Publication Data
US 2018/0217384 A1    Aug. 2, 2018

(30) Foreign Application Priority Data

Jul. 28, 2015 (FR) ..................................... 1557210

(51) Int. Cl.
*G02B 5/04* (2006.01)
*G02B 5/122* (2006.01)
(Continued)

(52) U.S. Cl.
CPC ............ *G02B 27/0972* (2013.01); *G02B 5/04* (2013.01); *G02B 5/122* (2013.01); *G02B 5/3058* (2013.01);
(Continued)

(58) Field of Classification Search
CPC . G02B 5/04; G02B 5/12; G02B 5/122; G02B 5/3058; G02B 5/3083; G02B 27/09;
(Continued)

(56) References Cited

U.S. PATENT DOCUMENTS 7,619,485 B2    11/2009 DeNatale et al.
2007/0070276 A1    3/2007 Tan
(Continued)

FOREIGN PATENT DOCUMENTS

CN    102830608 A    12/2012
CN    105514797 A    4/2016
(Continued)

OTHER PUBLICATIONS

International Search Report related to Application No. PCT/FR2016/051890 dated May 10, 2016.
(Continued)

*Primary Examiner* — Ryan S Dunning
(74) *Attorney, Agent, or Firm* — Miller, Matthias & Hull LLP

(57) ABSTRACT

Device for shaping a laser beam for an atomic sensor, comprising a retroreflector prism with an entrance area, an exit area and two reflection surfaces forming a right angle therebetween. The device for shaping includes a linear polarizer disposed upstream from the entrance area of the
(Continued)

retroreflector prism for linearly polarizing a laser beam entering into the retroreflector prism by the entrance area, and a form birefringence plate disposed downstream from the exit area of the retroreflector prism to circularly polarize a laser beam exiting from the retroreflector prism by the exit area.

13 Claims, 2 Drawing Sheets

(51) Int. Cl.
*G02B 5/30* (2006.01)
*G02B 27/09* (2006.01)
*G02B 27/28* (2006.01)
*G04F 5/14* (2006.01)

(52) U.S. Cl.
CPC ........... *G02B 5/3083* (2013.01); *G02B 27/28* (2013.01); *G04F 5/145* (2013.01)

(58) Field of Classification Search
CPC .............. G02B 27/0938; G02B 27/095; G02B 27/0972; G02B 27/0977; G02B 27/28; G02B 27/286; G04F 5/14; G04F 5/145
USPC ............ 359/485.01, 485.03, 485.04, 489.01, 359/489.06
See application file for complete search history.

(56) References Cited

U.S. PATENT DOCUMENTS

2009/0251224 A1 10/2009 Denatale
2011/0037928 A1* 2/2011 Little .................. G02B 5/3058
 349/96
2012/0212298 A1 8/2012 Lecomte et al.

FOREIGN PATENT DOCUMENTS

WO WO 2009/134269 A1 11/2009
WO WO 2011/026251 A1 3/2011

OTHER PUBLICATIONS

L. Nieradko, et al., New Approach of Fabrication and Dispensing of Micremachines Cesium Vapor Cell, fvlicor-Nanolithography Mems and Moemes, Publication Year: 2008.
A.M.A. Azzam, Polarization Properties of Retroreflecting Right-Angle Prisms, Applied Optics, vol. 47, p. 359, Publication Year: 2008.
D.C. Flanders, Submicrometer Periodicity Gratings as Artificial Anisotropic Dielectrics, Applied Physics Letters 42, p. 492-494, Publication Year: 1983.

* cited by examiner

DEVICE FOR SHAPING A LASER BEAM FOR AN ATOMIC SENSOR HAVING RETROREFLECTOR PRISM, LINEAR POLARIZER, AND FORM BIREFRINGENCE PLATE

CROSS-REFERENCE TO RELATED APPLICATION

This Application is a 35 USC § 371 US National Stage filing of International Application No. PCT/FR2016/051890 filed on. Jul. 21, 2016, and claims priority under the Paris Convention to French Patent Application No. 15 57210 filed on Jul. 28, 2015.

FIELD OF THE DISCLOSURE

The invention relates to the field of atomic sensors comprising alkaline vapor cells and laser beam shaping devices and also laser beam shaping devices for such atomic sensors.

BACKGROUND OF THE DISCLOSURE

The atomic sensors are in particular atomic clocks, micro-magnetometers and even micro-gyrometers. Such atomic sensors may, for example, be intended for telecommunication, navigation and defense systems.

Such sensors are sometimes described as "micro-atomic clocks", "micro-magnetometers" and "micro-gyrometers". Throughout the text, the term "micro" must be understood in the context and with the meaning indicated.

The operation of these atomic sensors rests on optical spectroscopy of gas atoms filling the cavity provided with an optical window. The gas is usually an alkaline vapor, such as cesium or rubidium. With this spectroscopy, one or more spectral quantities can be measured associated with the one or more physical quantities that the sensor observes, for example a frequency, temporal period, magnetic field or acceleration.

Such atomic sensors are attractive because they are small, energy-efficient and have very good measurement precision and stability.

A typical atomic sensor according to the invention is a chip-scale atomic clock, known under the acronym CSAC. One such example is the CSAC called SA.45s from Microsemi which has a volume of 16 cm$^3$, a mass of 35 g and requires only 120 mW power.

In the case of a micro atomic clock, the operation of the sensor is usually based on the measurement of the frequency of a specific microwave transition of the atoms of the gas, called clock transition and uses the principle of atomic resonance for coherent population trapping, known under the acronyms CPT.

Such a micro atomic clock is also known from the work of the Mac-TFC consortium, the FEMTO-ST (acronym for Franche-Comté Electronique Mecanique Thermique et Optique—Sciences et Technologies) which developed a very compact (a few mm$^3$) cesium vapor cell, with MEMS micro-machining (acronym for Micro-ElectroMechanical Systems) with silicon and anodic welding (see for example "New Approach of Fabrication and Dispensing of Micro-machined Cesium Vapor Cell" by L. Nieradko, C. Gorecki, A. Douahi, V. Giordano, J. C. Beugnot, J. Dziuban et M. Moraja Published in the JOURNAL OF MICRO-NANO-LITHOGRAPHY MEMS AND MOEMS, August 2008). Such a cell has an optical window diameter of about 2 mm.

The cell has an architecture referred to as "transmissive", where the laser, a vertical cavity laser known under the acronym VCSEL (for Vertical Cavity Surface Emitting Laser), and photodetector, (photodiode) are located on either side of the cell itself, with the laser beam passing through it from one side to the other, entering it by the first glass cover and exiting it by the second glass cover.

The beam coming from such a vertical cavity laser is characterized by relatively small divergence (FWHM of) 10-15°) and size (of order 20 μm near the exit mirror).

Thus, the distance required for reaching a beam diameter corresponding to the optical window of the cell and allowing lighting all of the atoms, if possible with equivalent intensities (uniform illumination), is therefore high if no additional device is added; this limits the minimum size of the atomic sensor.

To do that, in the context of the MAC-TFC Consortium, a telescopic system was developed with which to increase the divergence of the beam and to collimate the beam before entry thereof into the cell.

The bulk can be reduced with such a solution but it implies an alignment of several optical components which is a delicate operation at the dimensions of the cell.

Another solution is in particular known from the document U.S. Pat. No. 7,619,485 and shown in particular on FIG. 6 from that document. This solution consists of folding back the laser beam coming from the vertical cavity laser using mirrors or a prism but without changing the divergence values of the beam.

With such a solution several alignment constraints can be overcome. In fact, unlike lenses, poor positioning of the folding system (in translation) is no more harmful than would be the same positioning error of the source or the cell.

In this respect, using a prism is attractive compared to dielectric mirrors (also having low absorption) for providing excellent control of the orientation of the reflecting surfaces. In fact, the angular tolerance is in general specified at ±15 arcsec (±0.004°) even for prisms of a few millimeters on edge.

However, spectroscopy on the alkaline vapor by coherent population trapping requires a laser beam entering the cell with circular polarization.

Further, reflections of the laser beam in the prism can substantially change the polarization of the laser beam. In fact, even if the light beam does not leave the prism when the angle of incidence is greater than the critical angle defined above (i.e. there is no energy flux through the optical surface), the electromagnetic field on the other hand slightly enters into the exterior medium, with various penetration depths depending on the orientation of the electric field (parallel or perpendicular to the plane of incidence). The two components of the laser beam experience different phase shifts, a linearly polarized laser beam will for example become elliptically polarized after a total reflection. The article "Polarization properties of retroreflecting right-angle Prisms" by A. M. A. Azzam that appeared in the journal Applied Optics, vol. 47, p. 359 (2008) in particular describes this phenomenon in more detail.

Thus there is a need for a laser beam shaping device guaranteeing a size and controlled polarization of a laser beam at the entrance to the cell of an atomic sensor. Also there is a need for a device which has a limited power loss from the laser beam during shaping. Finally, there is a need for such a device which is the smallest possible and whose fabrication and integration into an atomic sensor is easy, in particular by limiting the number of constraining optical alignments to be implemented.

SUMMARY OF THE DISCLOSURE

Thus, the first subject of the invention is a laser beam shaping device intended in particular to be included in an atomic sensor such as an atomic clock, atomic magnetometer or atomic gyrometer by being combined both with a laser beam emission laser and also an alkaline vapor cell comprising a cavity filled with a gas into which a shaped laser beam could enter and a photo detector for receiving a laser beam having entered the cell, the shaping device comprises a retroreflector prism comprising an entrance area for an entering laser beam, an exit area for an exiting laser beam and also two internal laser beam reflection surfaces, said reflection surfaces forming a right angle therebetween.

The shaping device is characterized in that further comprises

A linear polarizer disposed upstream from the entrance area of the retroreflector prism so as to be traversed by a laser beam entering the retroreflector prism by the entrance area and able to linearly polarize said entering laser beam, and A form birefringence plate disposed downstream from the exit area of the retroreflector prism so as to be traversed by a laser beam exiting the retroreflector prism by the exit area and able to circularly polarize said exiting laser beam in order to obtain a shaped laser beam.

According to an implementation, the linear polarizer comprises a sub-wavelength metal network, and in that the sub-wavelength metal network of the linear polarizer comprises a plurality of metal plates extending parallel to each other along a metal plate direction and being juxtaposed one relative to the other along a passing direction of the metal network perpendicular to the metal plate direction.

According to an implementation, the passing direction of the metal network is parallel to a direction of intersection between the respective geometric planes of extension of the two reflection surfaces. In this way, the linear character of the polarization during the total internal reflections can be guaranteed.

According to an implementation, the form birefringence plate is an artificial form birefringence plate comprising a zero-order sub-wavelength dielectric network, and in that the zero-order sub-wavelength dielectric network of the form birefringence plate comprises a plurality of dielectric plates extending parallel to each other along a dielectric plate direction and being juxtaposed one relative to the other along a dielectric network direction perpendicular to the dielectric plate direction.

According to an implementation, the dielectric plate direction forms an angle of 45° with the metal plate direction.

According to an embodiment, the linear polarizer and the form birefringence plate are disposed side-by-side on a glass plate—or wafer.

According to an embodiment, the entrance area and the exit area of the retroreflector prism form two portions of the retroreflector prism transmission surface and in which the linear polarizer and the form birefringence plate are placed facing said transmission surface, which is either formed on said transmission surface or formed on a glass plate—or wafer—placed facing said transmission surface.

Also the subject of the invention is a fabrication process for a laser beam shaping device intended in particular to be included in an atomic sensor such as an atomic clock, atomic magnetometer or atomic gyrometer by being combined both with a laser beam emission laser and also an alkaline vapor cell comprising a cavity filled with a gas into which a shaped laser beam could enter and a photo detector for receiving a laser beam having entered the cell:

a retroreflector prism is arranged comprising an entrance area for an entering laser beam, an exit area for an exiting laser beam and also two internal laser beam reflection surfaces, said reflection surfaces forming a right angle therebetween;

a linear polarizer is formed and disposed able to linearly polarize an entering laser beam and disposed upstream from the entrance area of the retroreflector prism so as to be traversed by a laser beam entering the retroreflector prism by the entrance area; and a form birefringence plate is formed and disposed able to circularly polarize an exiting laser beam and disposed downstream from the exit area of the retroreflector prism so as to be traversed by laser beam exiting the retroreflector prism by the exit area.

According to an embodiment, the linear polarizer is formed by depositing a metal layer on a glass plate—or wafer—in particular an aluminum or gold layer; and the form birefringence plate is formed on said glass plate—or wafer—either by depositing a layer of dielectric material, in particular a silicon nitride layer, on said glass plate—or wafer—or by etching said glass plate—or wafer;

The linear polarizer is disposed upstream from the entrance area of the retroreflector prism and the form birefringence plate downstream from the exit area of the retroreflector prism by placing the glass plate—or wafer—facing a transmission surface of the retroreflector prism, where the entrance area and the exit area of the retroreflector prism form two portions of said transmission surface.

According to an embodiment, the linear polarizer is formed and disposed upstream from the entrance area of the retroreflector prism by depositing a layer of metal material, in particular a layer of aluminum or gold, on a transmission surface of the retroreflector prism, the entrance area of the retroreflector prism forming a portion of said transmission surface; and The form birefringence plate is formed and deposited downstream from the exit area of the retroreflector prism either by depositing a layer of dielectric material, in particular a layer of silicon nitride, on the transmission surface of the retroreflector prism, the exit area of the retroreflector prism forming a portion of said transmission surface, or by etching of said transmission surface.

Finally the subject of the invention is an atomic sensor comprising a laser beam shaping device such as described above compactly combined with both with a laser beam emission laser and also an alkaline vapor cell comprising a cavity filled with a gas in vapor phase into which a shaped laser beam could enter and a photo detector for receiving a laser beam having entered the cell.

According to an embodiment, a preferred direction of polarization of a laser beam emitted by the emission laser is substantially aligned with the passing direction of the linear polarizer metal network.

In the various figures, the same references designate identical or similar items.

DETAILED DESCRIPTION OF THE DISCLOSURE

Figure 1:
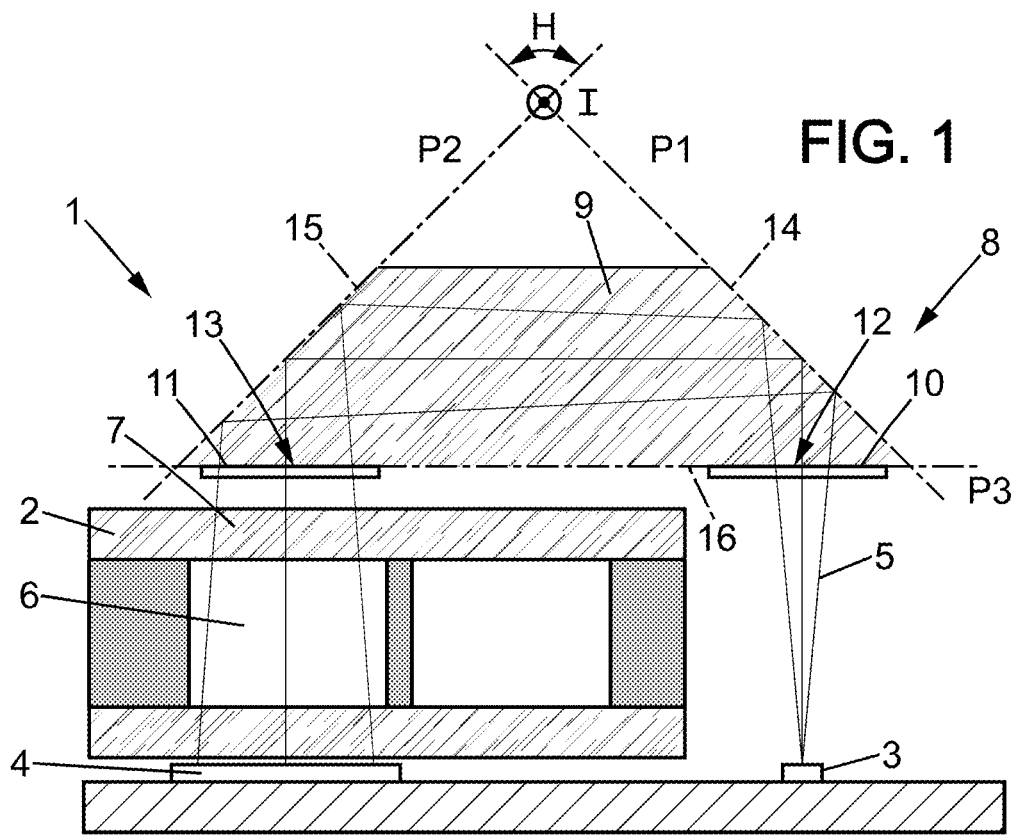
FIG. 1 is a schematic transverse section of an atomic sensor according to an embodiment of the invention, comprising a laser beam shaping device according to an embodiment of the invention, with which are combined a laser beam emission laser and also a cavity filled with a gas into which a shaped laser beam can enter and a photodetector receiving a laser beam having gone into the cell.

FIG. 1 shows an example of an atomic sensor 1 according to the invention incorporating an alkaline vapor cell 2, a laser beam emission laser 3, for example a vertical cavity laser (VCSEL for Vertical Cavity Surface Emitting Laser) and a receiving photodetector 4 for a laser beam having gone into the cell 2. The laser beam is designated by 5.

The atomic sensor 1 is for example a chip-scale atomic clock (CSAC) based on the principle of atomic resonance by coherent population trapping (CPT).

In variants of the invention, the atomic sensor 1 could be an atomic magnetometer or an atomic gyrometer for example.

The cell 2 in particular includes a gas cavity 6 provided with at least one optical window 7 and filled with a gas. The gas is for example a gas comprising an alkaline element in vapor phase like cesium or rubidium and, as applicable, a buffer gas. The term "gas" can designate a gas, vapor, or an alkaline vapor or a mixture of a gas and a vapor.

The atomic sensor 1 further comprises a laser beam shaping device 8.

The device 8 is inserted, in the path of the laser beam 5, between the laser 3 and the cell 2 and is able to receive a laser beam 5 from the laser 3 and to transmit a laser beam 5 entering into the gas cavity 6 by the optical window 7 of the cell 2.

The shaping device 8 comprises a retroreflector prism 9, a linear polarizer 10 and a form birefringence plate 11.

Figure 4:
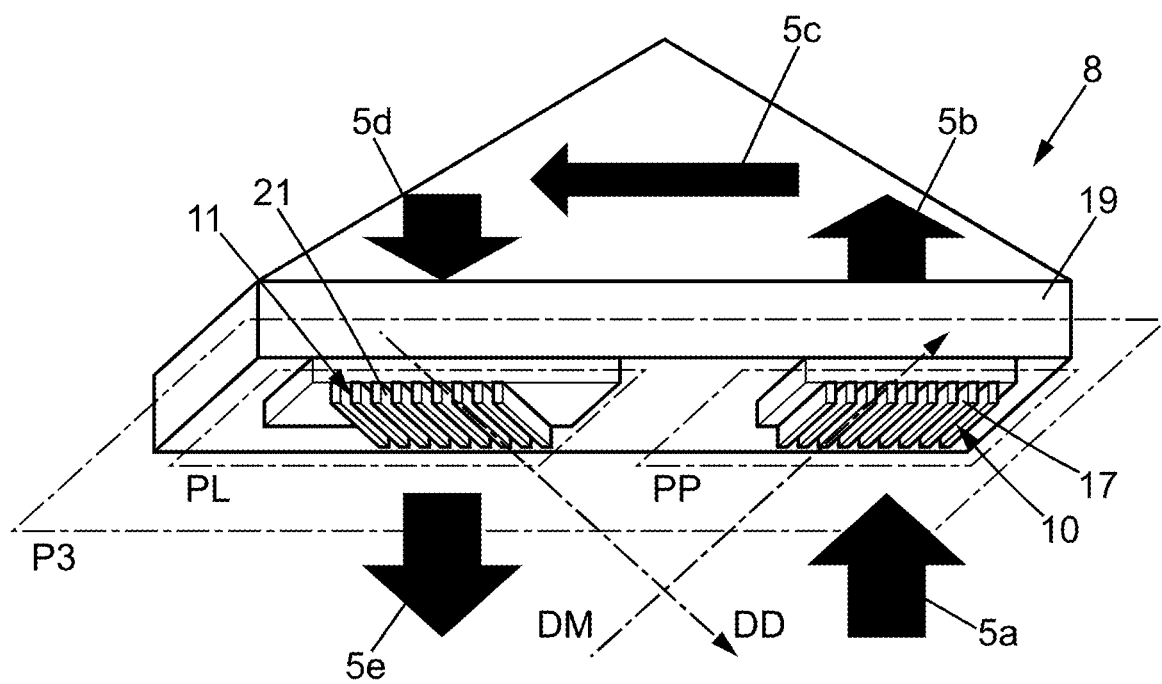
FIG. 4 is a detailed perspective drawing of a laser beam shaping device from FIG. 1, on which the path of a laser beam is shown comprising portions of initial laser beam, entering laser beam, internal laser beam, exiting laser beam and shaped laser beam.

In FIGS. 1 and 4, the retroreflector prism 9 comprises an entrance area 12 for an entering laser beam 5b, and exit area 13 for an exiting laser beam 5d and also two reflection surfaces 14, 15 for an internal laser beam 5c.

The reflection surfaces 14, 15 together form a right angle.

It is understood by "the surfaces together form a right angle", that the reflection surfaces 14, 15 extend respectively along respective geometric planes of extension P1, P2, such that said geometric planes of extension P1, P2 form a geometric right angle between them.

In the embodiment from FIG. 1, the entrance area 12 and the exit area 13 form two portions of a transmission surface 16 of the retroreflector prism 9.

The transmission surface 16 of the retroreflector prism 9 can for example be oriented at 45° to each of the reflection surfaces 14, 15.

Here again, "the transmission surface is oriented at 45° to each of the reflection surfaces 14, 15" means that the transmission surface extends along a geometric plane of extension P3 and the reflection surfaces 14, 15 extend respectively along the respective geometric planes of extension P1, P2 such that the geometric plane of extension P3 of the transmission surface forms a geometric angle of 45° with each of the geometric planes of extension P1, P2 of the reflection surfaces 14, 15.

It will be noted that, as much as the angle between the reflection surfaces 14, 15 must be precisely controlled for guaranteeing a retroreflection of the laser beam, the orientation between the transmission surface 16 and the reflection surfaces 14, 15 is less critical because at least for small angles it involves principally a spatial offset of the beam and not an angular error.

Thus, for example, the angle between the reflection surfaces 14, 15 is advantageously close to 90° within ±15 arcsec (±0.004°).

The path of the laser beam 5 in the retroreflector prism is illustrated in FIG. 4 and is broken down in the following way.

In entering laser beam 5b passes into the retroreflector prism 9 by the entrance area 12 and encounters a first reflection surface 14 generating an internal laser beam 5c. The internal laser beam 5c propagates in the retroreflector prism until encountering a second reflection surface 15 and generating an exiting laser beam 5d leaving the retroreflector prism 9 by the exit area 13.

The entering laser beam 5b and the exiting laser beam 5d are thus parallel to each other in a plane of section H of the retroreflector prism 9.

Such a plane of section H of the retroreflector prism 9 is in particular a plane perpendicular to the direction of intersection I between the respective geometric planes of extension P1, P2 of the two reflection surfaces 14, 15.

The retroreflector prism can for example be made of a material such as N-BK7, Soda-lime, N-BaK1 or even N-SF11.

Advantageously, the retroreflector prism can be made of a material having a sufficiently high index of refraction for guaranteeing a total reflection of the incident laser beam even when it has a relatively high divergence, as shown in FIG. 1.

The retroreflector prism can for example be made of N-BaK1 characterized by an index of refraction n=1.564 at an 852.1 nm wavelength; such an index of refraction guarantees a total reflection for a laser beam having an angle of incidence on the transmission surface 16 included between −8° and +8°.

Figure 2:
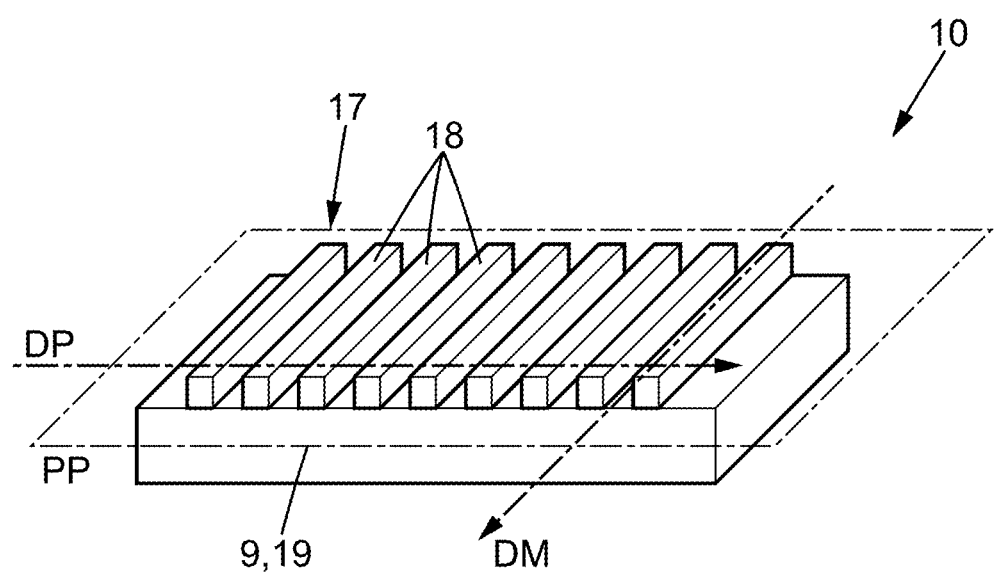
FIG. 2 is a detailed perspective view of a linear polarizer for the laser beam shaping device from FIG. 1, comprising a metal plate metal network.

The linear polarizer 10 is shown in more detail on FIG. 2 and comprises a subwavelength metal network 17.

This subwavelength metal network 17 comprises a plurality of metal plates 18. The metal plates 18 extend parallel to each other along a metal plate direction DM.

The metal plates 18 are additionally juxtaposed one relative to the other along a passing direction DP of the metal network 17 perpendicular to the metal plate direction DM.

"Subwavelength network" is understood in particular to mean that the metal plates are juxtaposed one relative to the others with a spatial period along the passing direction DP less than the wavelength of the laser beam 5, at normal incidence, divided by the index of refraction of the substrate supporting the metal plates, for example less than about 900 nm in the case of a cesium atomic clock.

The metal plates 18 are for example made of aluminum or gold.

Thus, the linear polarizer 10 can for example be formed by depositing a metal layer on a glass plate—or wafer—19, in particular an aluminum or gold layer.

In a sample embodiment provided purely for information, the linear polarizer 10 is formed by depositing a 300 nm thick aluminum layer shaped for having metal plates 18 spaced apart from each other with a period of 200 nm and each having a length of 90 nm along the passing direction of the network 17, meaning having a filling factor (width/period) of 0.45.

In a sample embodiment also provided purely for information, the linear polarizer 10 is formed by depositing a 350 nm thick gold layer shaped for having metal plates 18 spaced apart from each other with a period of 200 nm and each having a length of 157 nm along the passing direction of the network 17, meaning having a filling factor (width/period) of 0.45.

Other sizes of the linear polarizer 10, the metal network 17 and metal plates 18 are obviously conceivable.

The linear polarizer 10 is disposed upstream from the entrance area 12 of the retroreflector prism 9 so as to be traversed by a laser beam entering 5b the retroreflector prism 9 by the entrance area 12. The linear polarizer 10 is able to linearly polarize said entering laser beam 5b.

More precisely, the linear polarizer 10 receives an initial laser beam 5a emitted by the laser 3 and transforms it into an entering laser beam 5b having a defined linear polarization.

In fact, the component of the incident initial laser beam 5a which is parallel to the direction of the metal plate DM is converted into a displacement of electrons in the metal plates 18 and therefore absorbed by the linear polarizer 10, whereas the component of the instant initial laser beam 5a which is parallel to the passing direction DP of the metal network is left intact in the entering laser beam 5b.

In a specific embodiment of the invention, the emitting laser 3, for example a vertical cavity laser (VCSEL for Vertical Cavity Surface Emitting Laser), can comprise a network which guarantees oscillation in a single polarization mode, in particular a fixed and known linear polarization. In this embodiment, the initial laser beam 5a can also have a linear polarization along a polarization direction DL set by the laser 3.

It is important to note that the assembly constraints for the laser 3 in the atomic sensor 1 make the precise alignment of this polarization direction DL with the other elements of the atomic sensor like the form birefringence plate 11, the reflection prism 9 or the optical cell 2 very difficult.

Advantageously, the linear polarization of the initial laser beam 5a, emitted by the emission laser 3, is substantially aligned with the passing direction DP of the metal network 17 of the linear polarizer 10, meaning that the polarization direction DL and the passing direction DP of the metal network are substantially aligned.

"Substantially aligned" is understood to mean that the two directions are parallel or else close to parallel, for example forming an angle between them of less than 10°.

Additionally, the linear polarizer 10 is placed facing the transmission surface 16 of the retroreflector prism 9, by being either disposed in said transmission surface 16 or formed on a glass plate—or wafer—19 in contact with said transmission surface 16.

As shown in FIG. 2, the metal network 17 of the linear polarizer 10 can in particular extend in a geometric plane of extension PP, formed by the passing direction DP and the metal plate direction DM, such that said geometric plane of extension PP is parallel to the geometric plane of extension P3 of the transmission surface 16.

The passing direction DP of the metal network 17 can in particular be parallel to the direction of intersection I between the geometric planes of extension P1, P2 of the two reflection surfaces 14, 15.

In this way, the linear polarization applied to the entering laser beam 5b is maintained during reflections in the prism 9 and therefore maintained in the exiting laser beam 5d.

Figure 3:
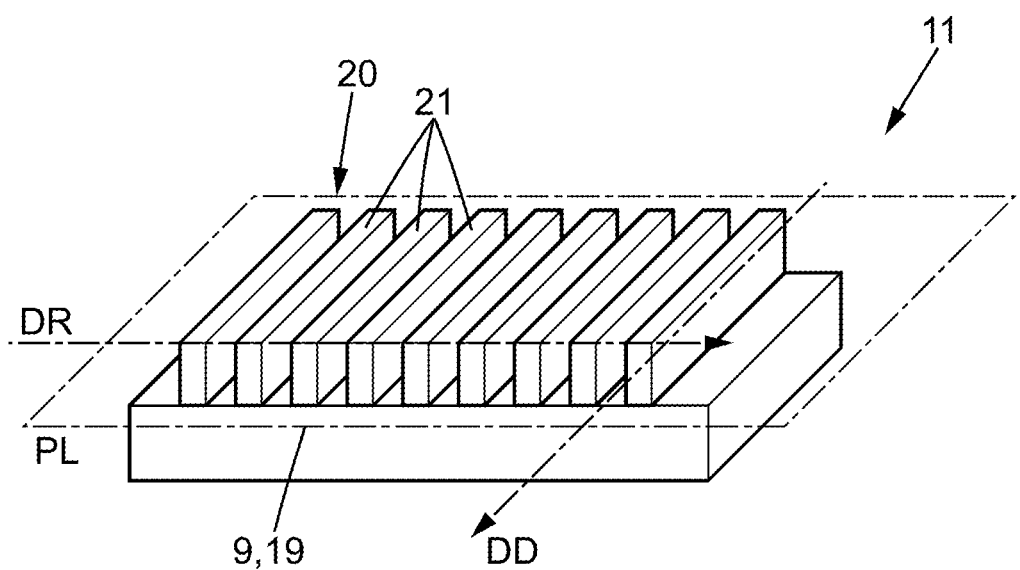
FIG. 3 is a detailed perspective view of a form birefringence plate for the laser beam shaping device from FIG. 1, comprising a zero-order subwavelength dielectric network of dielectric plates.

Additionally, the form birefringence plate 11 is shown in more detail in FIG. 3. The form birefringence plate 11 is for example a form birefringence or artificial birefringence plate.

For this purpose, the form birefringence plate 11 comprises a zero-order subwavelength dielectric network 20.

This dielectric network 20 comprises a plurality of dielectric plates 21. The dielectric plates 21 extend parallel to each other along a dielectric plate direction DD.

The dielectric plates 21 are additionally juxtaposed one relative to the other along a dielectric network direction DR perpendicular to the dielectric plate direction DD.

"Subwavelength network" is here again understood in particular to mean that the dielectric plates are juxtaposed one relative to the others with a spatial period along the dielectric network direction DR less than the wavelength of the laser beam 5, at normal incidence, divided by the index of refraction of the substrate supporting the dielectric plates, for example less than about 900 nm in the case of a cesium atomic clock.

"Zero order dielectric network", or "zero order grating", is understood to mean a dielectric network for which the period separating the dielectric plates is sufficiently small that the dielectric network does not generate propagating diffraction orders except order 0.

With such a zero order dielectric network, the phase shift between the transverse electric component and the transverse magnetic component of an incident laser beam can be controlled and therefore the polarization of the exiting light as a function of the polarization of the entering light.

The dielectric plates 21 are for example implemented in glass or silicon nitride ($Si_3N_4$).

Thus, the form birefringence plate 11 can for example be formed by depositing a silicon nitride layer ($Si_3N_4$) on a glass plate—or wafer—19, for example the glass plate—or wafer—19 on which the linear polarizer 10 is formed.

Alternatively, the form birefringence plate 11 can be formed of glass (silica), for example by etching of a glass plate—or wafer—19, for example the glass plate—or wafer—19 on which the linear polarizer 10 is formed.

In an embodiment provided purely for illustration, the form birefringence plate 11 is formed by etching of a glass plate—or wafer—19 formed for having dielectric plates 21 with a thickness of 2710 nm separated from each other with a period of 580 nm, where the dielectric network 20 has a filling factor (width/period) of 0.464. The aspect ratio of such a network (thickness/width) is therefore about 10.

In another embodiment also provided purely for illustration, the form birefringence plate 11 is formed by depositing a silicon nitride layer with a thickness of 598 nm shaped for having dielectric plates 21 separated from each other with a period of 580 nm, where the dielectric network 20 has a filling factor (width/period) of 0.331. The aspect ratio of such a network (thickness/width) is therefore about 3.

Other sizes of the form birefringence plate 11, dielectric network 20 and dielectric plates 21 are obviously conceivable.

The form birefringence plate 11 is disposed downstream from the exit area 13 of the retroreflector prism 9 so as to be traversed by a laser beam exiting 5d the retroreflector prism 9 by the exit area 13. The form birefringence plate 11 is able to circularly polarized said exiting laser beam 5d for obtaining a shaped laser beam 5e.

With such a zero order dielectric network, the phase shift between the transverse electric component and the transverse magnetic component of an incident laser beam can be controlled and therefore the polarization of the leaving light depending on the polarization of the entering light.

In fact, as detailed earlier, with such a dielectric network 20 the phase shift between the transverse electric component and the transverse magnetic component of an incident laser beam can be controlled and therefore the polarization of the exiting light as function of the polarization of the entering light. The dielectric network 20 therefore behaves like an anisotropic material, where the anisotropy does not arise from intrinsic properties of the material but from the periodic structure implemented on the surface thereof, which is sufficiently small for artificially manipulating the index of refraction.

The dimensions of the dielectric network 20 are determined such that, for an exiting beam 5d having linear polarization, the polarization of the shaped beam 5e is circular, and for example has an ellipticity of the circular polarization less than 1.1. Such a polarization can be obtained with the dielectric network 21 examples detailed above.

To adapt the dimensions of the dielectric network 20, the equations of effective medium theory (EMT) can for example be used. On this subject, also refer to the information in the document "Submicrometer periodicity gratings as artificial anisotropic dielectrics," by D. C. Flanders, that appeared in the journal Appl. Phys. Lett. 42, 492-494 (1983).

Additionally, the form birefringence plate 11 is placed facing the transmission surface 16 of the retroreflector prism 9, by being either disposed in said transmission surface 16 or formed on a glass plate—or wafer—19 in contact with said transmission surface 16.

Thus for example, the linear polarizer 10 and the form birefringence plate 11 can be disposed side-by-side on the glass plate—or wafer—19.

As shown in FIG. 3, the dielectric network 20 of the form birefringence plate 11 can in particular extend in a geometric plane of extension PL, formed by the dielectric plate direction DD and the dielectric metal direction DR, such that said geometric plane of extension PL is parallel to the geometric plane of extension P3 of the transmission surface 16.

Additionally, the geometric plane of extension PL of the dielectric network 20 can be parallel to the geometric plane of extension PP of the metallic network 17.

More specifically, the dielectric plate direction DD of the dielectric network 21 can form an angle of 45° with the metal plate direction DM.

Similarly, given that the dielectric network direction DR and the dielectric plate direction DD of the dielectric network 21 are perpendicular, the direction of the dielectric network DR can form an angle of 45° with the direction of the metal plate DM.

Or again, given that the passing direction DP of the metal plate and the metal plate direction DM of the metal network 17 are perpendicular, the passing direction DP of the metal plate can form an angle of 45° with the direction of the dielectric network DR or the direction of the dielectric plate DD.

In these ways, the shaped laser beam 5e can be circularly polarized.

The invention claimed is:

1. A laser beam shaping device intended in particular to be included in an atomic sensor such as an atomic clock, atomic magnetometer or atomic gyrometer by being combined both with a laser beam emission laser and also an alkaline vapor cell comprising a cavity filled with a gas into which a shaped laser beam could enter and a photo detector for receiving a laser beam having entered the cell,
   the shaping device comprises a retroreflector prism comprising an entrance area for an entering laser beam, an exit area for an exiting laser beam and also two internal laser beam reflection surfaces, said reflection surfaces forming a right, angle therebetween,
   wherein the shaping device further comprises
     a linear polarizer disposed upstream from the entrance area of the retroreflector prism so as to be traversed by a laser beam entering the retroreflector prism by the entrance area and able to linearly polarize said entering laser beam, and
     a form birefringence plate disposed downstream from the exit area of the retroreflector prism so as to be traversed by a laser beam exiting the retroreflector prism by the exit area and able to circularly polarize said exiting laser beam in order to obtain a shaped laser beam.

2. The device according to claim 1, wherein the linear polarizer comprises a sub-wavelength metal network, and wherein the sub-wavelength metal network of the linear polarizer comprises a plurality of metal plates extending parallel to each other along a metal plate direction and being juxtaposed one relative to the other along a passing direction of the metal network perpendicular to the metal plate direction.

3. The device according to claim 2, wherein the passing direction of the metal network is parallel to a direction of intersection between the respective geometric planes of extension of the two reflection surfaces.

4. The device according to claim 1, wherein the form birefringence plate comprises a zero-order sub-wavelength dielectric network, and Wherein the zero-order sub-wavelength dielectric network of the form birefringence plate comprises a plurality of dielectric plates extending parallel to each other along a dielectric plate direction and being juxtaposed one relative to the other along a dielectric network direction perpendicular to the dielectric plate direction.

5. The device according to claim 4, wherein the linear polarizer comprises a sub-wavelength metal network, wherein the sub-wavelength metal network of the linear polarizer comprises a plurality of metal plates extending parallel to each other along a metal plate direction and being juxtaposed one relative to the other along a passing direction of the metal network perpendicular to the metal plate direction, and wherein, the dielectric plate direction forms an angle of 45° with the metal plate direction.

6. The device according to claim 4, wherein the passing direction of the metal network is parallel to a direction of intersection between the respective geometric planes of extension of the two reflection surfaces, and wherein the dielectric plate direction forms an angle of 45° with the metal plate direction.

7. The device according to claim 1, wherein the linear polarizer and the form birefringence plate are disposed side-by-side on a glass plate—or wafer.

8. The device according to claim 1, wherein the entrance area and the exit area of the retroreflector prism form two portions of the retroreflector prism transmission surface and in which the linear polarizer and the form birefringence plate are placed facing said transmission surface, which are either formed on said transmission surface or formed on a glass plate—or wafer—placed facing said transmission surface.

9. An atomic sensor comprising a device for shaping a laser beam according to claim 1, combined, compactly, both with a laser beam emission laser and also an alkaline vapor cell comprising a cavity filled with a gas into which a shaped laser beam could enter and a photo detector for receiving a laser beam having entered the cell.

10. The atomic sensor according to claim 9, wherein a preferred direction of polarization of a laser beam emitted by the emission laser is substantially aligned with the passing direction of the linear polarizer metal network.

11. A process for fabrication of a device for laser beam shaping intended in particular to be included in an atomic sensor such as an atomic clock, atomic magnetometer or atomic gyrometer by being combined both with a laser beam emission laser and also an alkaline vapor cell comprising a cavity filled with a gas into which a shaped laser beam could enter and a photo detector for receiving a laser beam having entered the cell, wherein:
   a retroreflector prism is disposed comprising an entrance area for an entering laser beam an exit area for an exiting laser beam and also two internal laser beam reflection surfaces, said reflection surfaces forming a right angle therebetween,
   a linear polarizer is formed and disposed able to linearly polarize an entering laser beam and disposed upstream from the entrance area of the retroreflector prism so as to be traversed by a laser beam entering the retroreflector prism by the entrance area; and
   a form birefringence plate is formed and disposed able to circularly polarize an exiting laser beam and disposed downstream from the exit area of the retroreflector prism so as to be traversed by laser beam exiting the retroreflector prism by the exit area.

12. Process according to claim 11, wherein
the linear polarizer is formed by depositing a metal layer on a glass plate—or wafer, in particular an aluminum or gold layer; and
the form birefringence plate is formed on said glass plate—or wafer—either by depositing a layer of dielectric material, in particular a silicon nitride layer, on said glass plate—or wafer—or by etching said glass plate—or wafer;
the linear polarizer is disposed upstream from the entrance area of the retroreflector prism and the form birefringence plate downstream from the exit area of the retroreflector prism by placing the glass plate—or wafer—facing a transmission surface of the retroreflector prism, where the entrance area and the exit area of the retroreflector prism form two portions of said transmission surface.

13. Process according to claim 11, wherein
the linear polarizer is formed and disposed upstream from the entrance area of the retroreflector prism by depositing a layer of metal material, in particular a layer of aluminum or gold, on a transmission surface of the retroreflector prism, the entrance area of the retroreflector prism forming a portion of said transmission surface; and
the form birefringence plate is formed and deposited downstream from the exit area of the retroreflector prism either by depositing a layer of dielectric material, in particular a layer of silicon nitride, on the transmission surface of the retroreflector prism, the exit area of the retroreflector prism forming a portion of said transmission surface, or by etching of said transmission surface.

* * * * *